(12) United States Patent
Roitman et al.

(10) Patent No.: US 6,552,101 B1
(45) Date of Patent: *Apr. 22, 2003

(54) PROCESSOR POLYMERS FOR THE ELECTROCHEMICAL DEPOSITION OF ELECTRICALLY CONDUCTING POLYMER FILMS

(75) Inventors: Daniel B. Roitman, Menlo Park, CA (US); Seiji Inaoka, Birmingham, AL (US); Riogoberto C. Advincula, W. Hoover, AL (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/401,665

(22) Filed: Sep. 22, 1999

(51) Int. Cl.[7] .......................... C08F 32/08; C08F 32/04; C25B 3/00
(52) U.S. Cl. .................... 522/167; 252/182.1; 522/168; 526/259; 526/263; 526/256; 528/378; 528/380; 528/396; 528/423
(58) Field of Search ................................. 528/396, 423, 528/380, 378, 392; 522/167, 168; 252/182.1; 205/50

(56) References Cited

U.S. PATENT DOCUMENTS 5,587,444 A * 12/1996 Uchida ........................ 526/247
6,294,245 B1 * 9/2001 Roitman ...................... 428/212

FOREIGN PATENT DOCUMENTS

WO   WO 94/15441   *   7/1994

OTHER PUBLICATIONS

Roy,A. et al, Proc Natl Symp Therm Anal. 8th (1991), 407–11.*
Geissler, U. et al, Synth Met (1993), 55(2–3), 1483–8.*

* cited by examiner

Primary Examiner—Kelechi Egwim

(57) ABSTRACT

A precursor polymer that can be electrochemically polymerized to form an electrically conducting polymer. A precursor according to the present invention includes a plurality of electrochemical polymerizable monomers, each monomer having first and second polymer-forming active sites that can be joined by electrochemical polymerization. The monomers also include third and fourth polymer-forming active sites that can be joined chemically in solution. The monomers in the precursor polymer are linked by the third and fourth polymer-forming active sites. The monomers are chosen such the precursor polymer is soluble in a predetermined solvent while the polymer resulting from the electrochemical polymerization of the precursor polymers via the first and second polymer-forming sites is electrically conducting and insoluble in the solvent. The monomers can be synthesized from fluorene, triophene, pyrrol, biphenyl, poly (vinyl carbazole) or poly (vinyl oxy thiophene). Monomers comprising dimers chosen from this group can also be utilized. The monomers may also include a spacer group bonded to one of the first or second polymer-forming active sites. Spacer groups consisting of $(CH_2)_n$, $(OCH_2)_n$, or $(OCH_2CH_2)_n$, where $1 \leq n \leq 20$ may be utilized for this purpose.

5 Claims, 6 Drawing Sheets

US 6,552,101 B1

PROCESSOR POLYMERS FOR THE ELECTROCHEMICAL DEPOSITION OF ELECTRICALLY CONDUCTING POLYMER FILMS

FIELD OF THE INVENTION

The present invention relates to polymer-based electroluminescent devices, and more particularly, to a class of precursors for generating the electrically conducting polymers that provide electroluminescent layer in such devices.

BACKGROUND OF THE INVENTION

Polymer-based electroluminescent devices (PLEDs) have the potential for providing inexpensive alternatives to alpha-numeric displays and x-y addressable displays. PLEDs also have the potential to provide an alternative to back lighted, liquid crystal displays. A simple PLED may be constructed from an electroluminescent layer sandwiched between an electron injection electrode and a hole injection electrode. The electroluminescent layer is typically constructed by depositing a conjugated or conductive polymer on one of the electrodes. Devices based on poly(p-phenylenevinylene) (PPV), or derivatives thereof, have been demonstrated with sufficient quantum yields to be commercially attractive. More complicated devices utilize electron and hole transport layers between the above mentioned electrodes and the electroluminescent layer. The electroluminescent layer generates light when holes and electrons recombine in the layer.

The deposition and patterning of the electroluminescent layer present significant technical problems that must be overcome before economically attractive devices can be fabricated. If the conjugated polymer is soluble in a solvent, a thin film can be made by the spin-coating of a polymer solution. While spin-coated polymer films having good electro-optical properties can be obtained in this manner, the adhesion of spin-coated film to the underlying layer is often insufficient. In addition, many attractive polymers are not sufficiently soluble to be applied via spin-coating.

Spin-coating and other processes in which the entire substrate is coated, present additional problems in multi-color displays in which different "pixels" must be coated with different polymers. The deposition of each layer requires a three-step procedure consisting of a masking step to protect areas that are not to be coated, the spin-coating step, and a mask removal step. In addition to the increased complexity of the masking steps, the solvents utilized with conventional masking systems are often incompatible with the polymers being deposited. Accordingly, it would be advantageous to provide a system that does not require such masking operations.

To avoid these limitations, thin films of various conjugated polymers have been prepared by the electrochemical polymerization of a monomer solution. In principle, this method can also provide a film of conjugated polymer that is not soluble in any solvent, and hence cannot be deposited by spin-coating. In this method, a monomer of the polymer is dissolved in a solvent and then the polymer film is deposited on an electrode by maintaining the electrode at a potential with respect to the solvent. The solvent is chosen such that the monomer is soluble therein, while the formed conjugated polymer is insoluble. Unfortunately, the quality of such polymer films leaves much to be desired. In many cases, the film consists of a layer of powdery material that is precipitated in the vicinity of the electrode rather than being deposited onto the electrode. This precipitation problem results from the poor solubility of polymer units having a few monomers connected together that are formed in the vicinity of the electrode. Attempts to overcome this problem by utilizing parent monomers with flexible alkyl groups to increase the solubility of short chain polymer units have not yielded films of a quality needed for electronic devices. In addition, this approach also has a disadvantage of reducing the concentration of electroactive functional groups in the film structure, and hence, the efficiency of light generation by the films.

Broadly, it is the object of the present invention to provide an improved precursor material for use in the generation of electrically conducting polymers such as those used in PLEDs.

It is another object of the present invention to provide a precursor material that can be utilized to generate an electrically conducting polymer layer via electrochemical polymerization.

These and other objects of the present invention will become apparent to those skilled in the art from the following detailed description of the invention and the accompanying drawings.

SUMMARY OF THE INVENTION

The present invention is a precursor polymer that can be electrochemically polymerized to form an electrically conducting polymer. A precursor according to the present invention includes a plurality of electrochemical polymerizable monomers, each monomer having first and second polymer-forming active sites that can be joined by electrochemical polymerization. The monomers also include third and fourth polymer-forming active sites that can be joined chemically in solution. The monomers in the precursor polymer are linked by the third and fourth polymer-forming active sites. The monomers are chosen such the precursor polymer is soluble in a predetermined solvent while the polymer resulting from the electrochemical polymerization of the precursor polymers via the first and second polymer-forming sites is electrically conducting and insoluble in the solvent. The monomers can be synthesized from fluorene, triophene, pyrrol, biphenyl, poly(vinyl carbazole) or poly (vinyl oxy thiophene). Monomers comprising dimers chosen from this group can also be utilized. The monomers may also include a spacer group bonded to one of the first or second polymer-forming active sites. Spacer groups consisting of $(CH_2)_n$, $(OCH_2)_n$, or $(OCH_2CH_2)_n$, where $1 \leq n \leq 20$ may be utilized for this purpose.

DETAILED DESCRIPTION OF THE INVENTION

Figure 1:
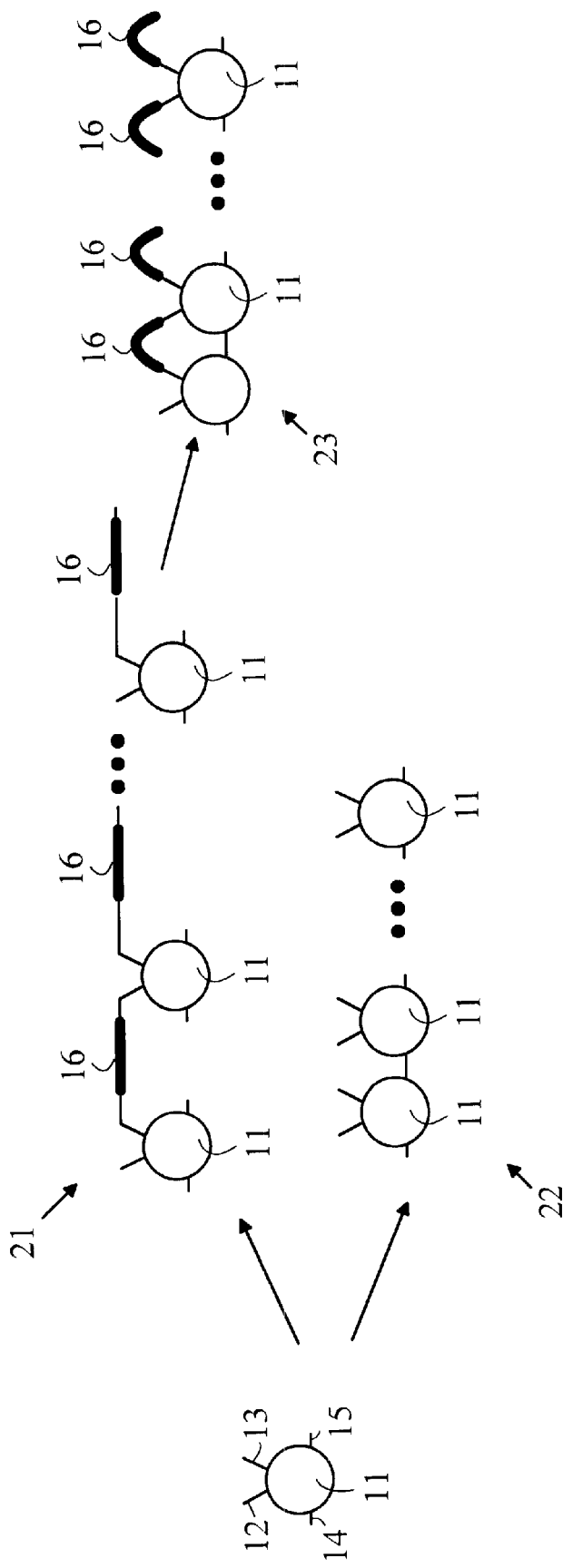
FIG. 1 illustrates the polymerization of monomer units via two different processes.

The manner in which the present invention achieves its advantages may be more easily understood with reference to FIG. 1, which is a schematic drawing of the polymerization of monomer units 11 via two different processes. Monomer 11 is chosen such that it has four functional groups that can be utilized to form polymers. Groups 12 and 13 can be linked with the aid of a spacer 16 to form a polymer 21 that is soluble in a predetermined solvent, but which is neither conducting nor electroluminescent. Groups 14 and 15 can be linked via electrochemical polymerization to form either an electroluminescent or electrically conducting polymer 22, which is insoluble in the solvent. Since polymer 22 is insoluble, the number of units that can be linked electrochemically is limited. As a result, the quality of polymer films obtained by electrochemical polymerization groups 14 and 15 leaves much to be desired. In many cases, the film consists of a layer of powdery material that is precipitated in the vicinity of the electrode rather than being deposited onto the electrode. This precipitation problem results from the poor solubility of polymer units having a few monomers that are electrochemically linked together that are formed in the vicinity of the electrode. Attempts to overcome this problem by utilizing parent monomers with flexible-side groups to increase the solubility of short chain polymer units have not yielded films of a quality needed for electronic devices. In addition, this approach also has a disadvantage of reducing the concentration of electroactive functional groups in the film structure, and hence, the efficiency of light generation by the films.

The present invention avoids the problems associated with polymer 22 by utilizing polymer 21 as the precursor for forming an electrically conducting or electroluminescent polymer 23 by electrochemical polymerization of polymer 21. The spacers 16 in polymer 21 provide a high degree of connectivity to the moieties contain groups 13 and 14, and hence, result the deposited film having a higher degree of mechanical strength and uniformity than the films obtained by direct electrochemical polymerization of the unlinked moieties. As a result, the polymer is deposited on the electrode and can grow into a high quality film.

Figure 2:
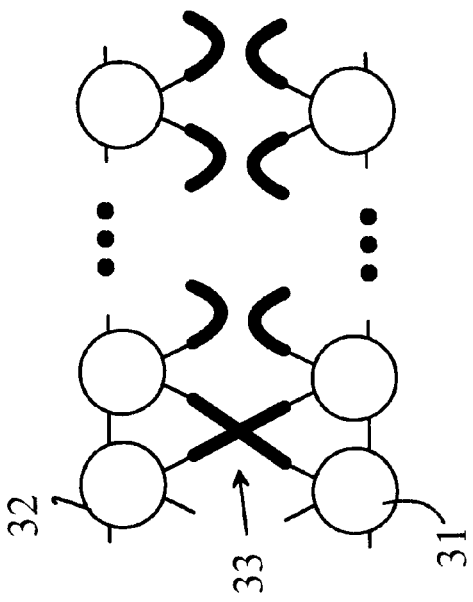
FIG. 2 is an example of a flexible spacer cross-linking between two chains of monomers.

The film formed during the electrochemical polymerization may be two-dimensional, or even, three-dimensional because of the cross-linking of the various one-dimensional polymer chains. The cross-linking occurs through the sites used to link the flexible spacers or through the electroluminescently active sites. An example of a flexible spacer cross-linking between two chains 31 and 32 is shown in FIG. 2. The cross-link is shown at 33. This type of cross-linked structure is formed during the preparation of the precursor polymers. In this case, the pi-conjugated bonds are formed during electrochemical polymerization between monomers in the same chain.

Figure 3:
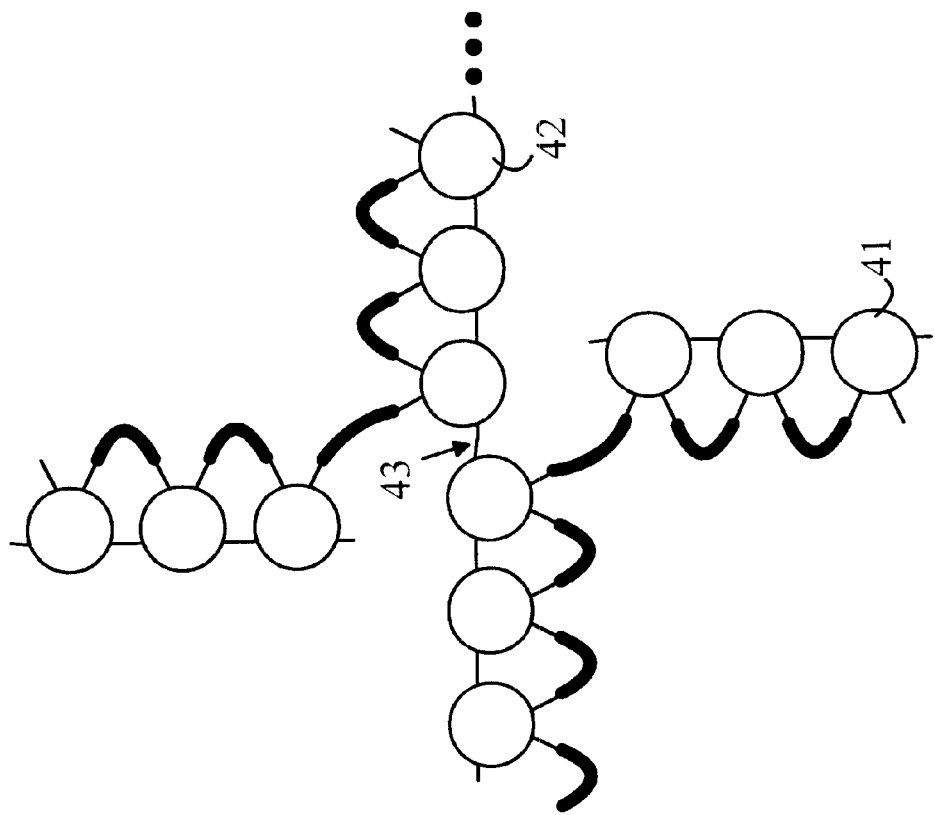
FIG. 3 is an example of a cross-linking between two chains of monomers via an electroluminescent active site.

An example of a cross-linking between two chains 41 and 42 via a pi-conjugated bond 43 is shown in FIG. 3. In this case, the chains are linked during the electrochemical polymerization. It will also be apparent from the previous discussion that more complex arrangements may be formed in which two or three-dimensional chains are further cross-linked during either the original polymerization using the flexible spacers or the electrochemical polymerization.

Figure 4:
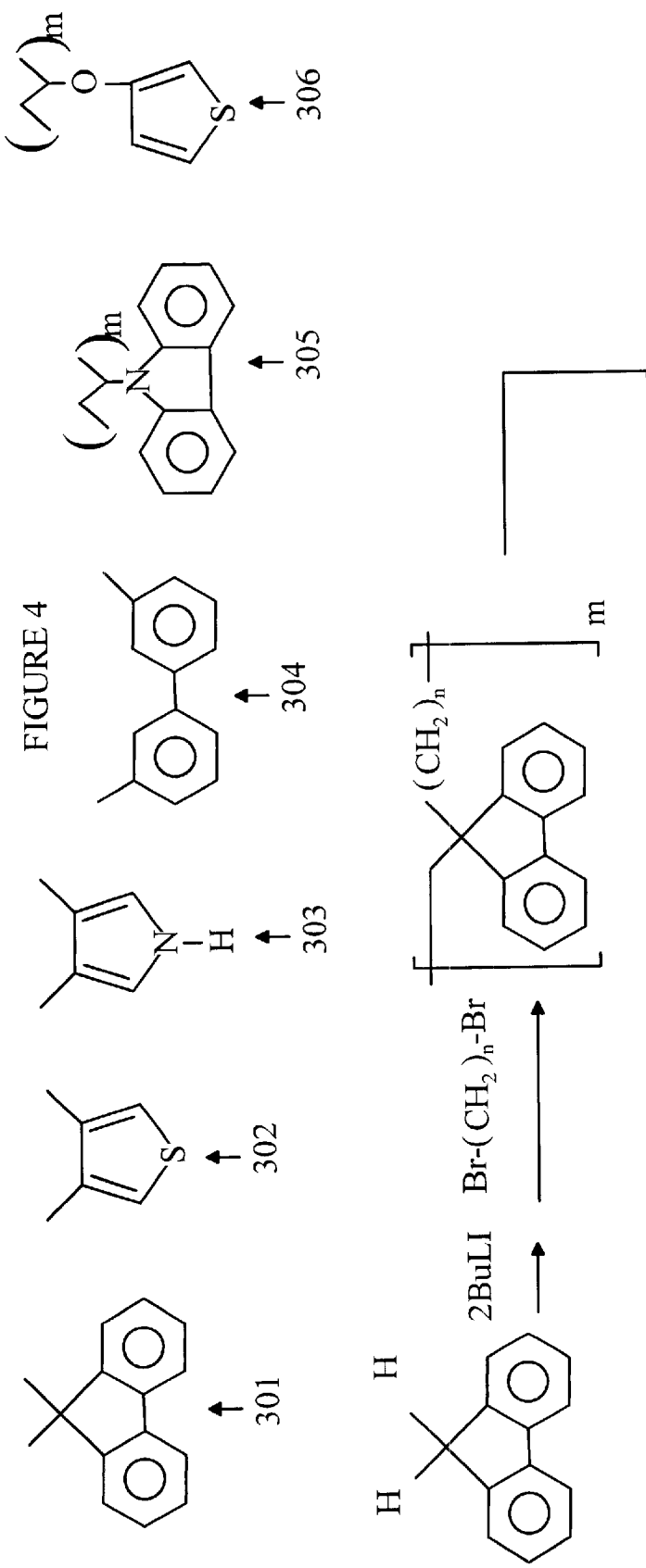
FIG. 4 shows some examples of monomeric functional groups that may be utilized to form the precursor polymers of the present invention.

Some examples of monomeric functional groups that may be utilized to form the precursor polymers are shown in FIG. 4 at 301–306. Compounds 301–306 are fluorene, triophene, pyrrol, biphenyl, poly(vinyl carbazole) and poly(vinyl oxy thiophene), respectively. These groups may be joined by spacers of the form $(CH_2)_n$, $(OCH_2)_n$, $(OCH_2CH_2)_n$, ..., where $1 \leq n \leq 20$.

Figure 5:
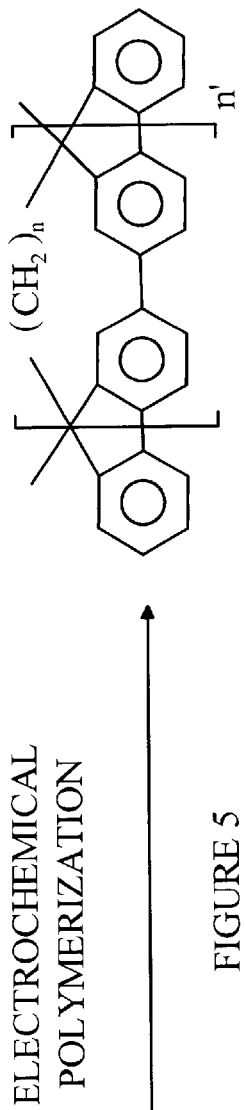
FIG. 5 illustrates the preparation of one class of electroluminescent polymers according to the present invention.

Refer now to FIG. 5, which illustrates the preparation of one class of electroluminescent polymers according to the present invention. A series of precursor polymers was prepared by dilithiation of fluorene with n-butyllithium, followed by the reaction with $\alpha,\omega$-dibromoalkanes (n=4,6,8, 10,12). The formed precursor polymers are soluble in common organic solvents such as chloroform, dichloromethane or toluene.

Electrochemical polymerization is carried out using solutions of precursor polymers at a concentration of 50 mM with electrolyte (tetrabutylammonium tetrafluoroborate: 100 mM) in dichloromethane as a solvent. Conductive glass substrates with a thin layer of indium-tin oxide may be used as working electrodes. Cyclic voltammetry is performed for each precursor polymer solution, between −200 mV and +2000 mV (versus Ag/Ag+ reference electrode). At the first cycle, the oxidation of the fluorene group is observed at +1350 mV. At the following cycles, reversible oxidation and reduction is observed at around +1200 mV, and the change in color of the material on the electrode is observed (light brown at low apotential, bright red at high potential). After the film has reached the desired thickness, the electrodes are rinsed with toluene, which is a good solvent for these precursor polymers to remove any non-electrochemically polymerized precursor polymers. A thin film of a light-brown material remains on the electrode surface. This film exhibits an absorbence spectra that is very close to that of poly(fluoren-2,7-diyl).

Figure 6:
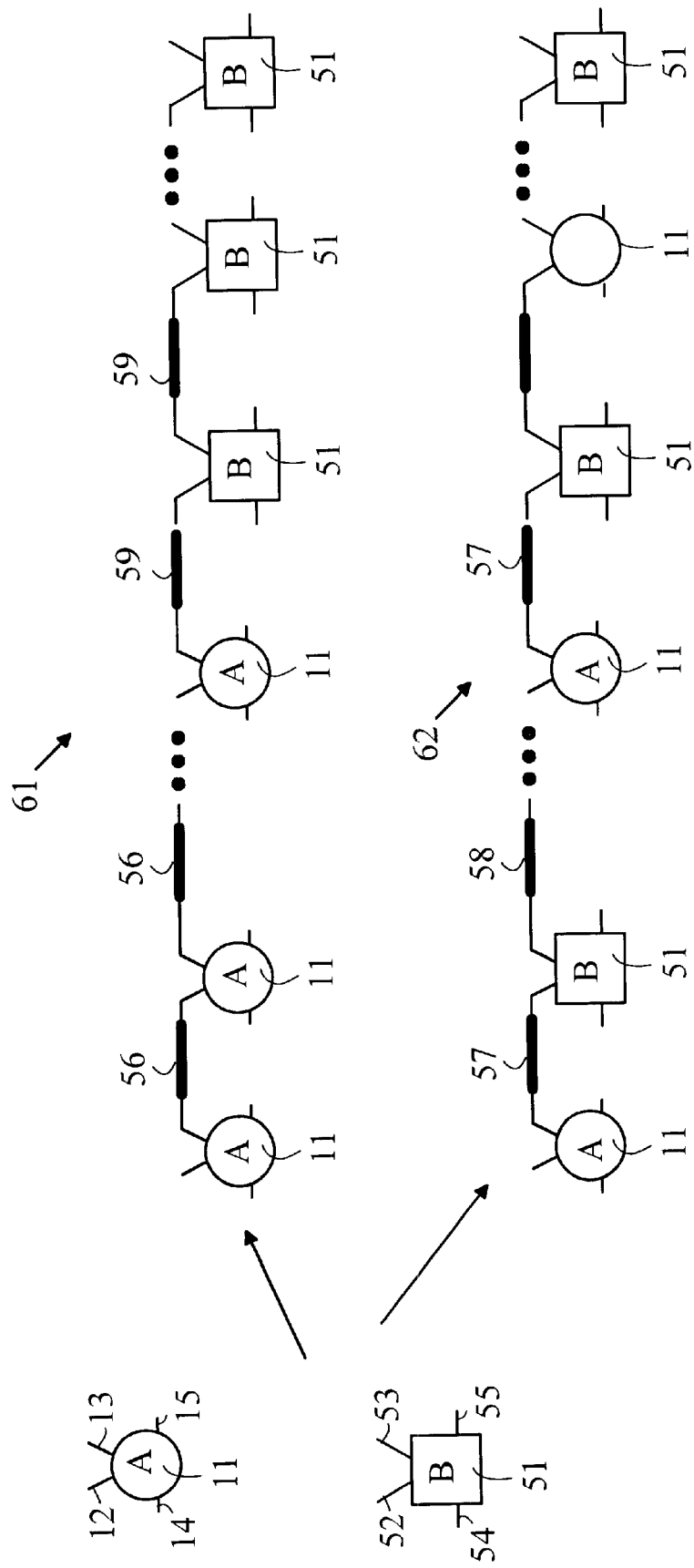
FIG. 6 is a schematic representation of two possible polymers formed from monomers labeled A and B.

The precursors of the present invention can also be utilized to form films of copolymers from monomers having different electronic characteristics, such as emission spectra and energy bands. Refer now to FIG. 6, which is a schematic representation of two possible polymers formed from monomers labeled A and B. To simplify the discussion, unit A is assumed to be the same as monomer unit 11 shown in FIG. 1. Unit B, which is shown at 51, also has two active sites, 52 and 53, that may be used to polymerize the monomers to form a soluble chain that does not emit light and two active sites, 54 and 55, that can be joined via electrochemical polymerization to form a light emitting polymer that is insoluble in the solvent. The monomeric units can be combined to form a soluble copolymer precursor in a number of different configurations. For example, a precursor block copolymer 61 can be generated by combining the A units via spacer 56 to form a poly-A precursor that is then joined to a poly-B precursor formed by joining the B monomers via spacers 59. Similarly, the two sub-units can be joined via a spacer 57 to form the alternating copolymer precursor 61. A second configuration for the electrochemical polymerization precursor is shown at 62. In this case, a dimer consisting of one A-unit and one B-unit is first formed. The dimers are then polymerized with the aid of spacers 58 to form the alternative copolymer precursor.

While the examples shown in FIG. 6 utilize different spacers, it will be obvious to those skilled in the art from the preceding discussion that the monomers may be chosen such that a single spacer unit can be utilized for all of the sub-unit attachments. A random copolymer precursor polymer may be constructed by applying the solution polymerization process to a solution containing both monomers. It will also be apparent form the preceding discussion that precursors having more than two types of monomers may also be constructed in this manner. For example, the monomeric functional groups can be two or more of any electrochemically polymerizable group such as fluorene, thiophene, pyrrole, phenylene, pyridine, or triptycene or one of the derivatives of the above compounds. Component of each species can be between 0.001% and 99.999%.

The precursor copolymer can have any form of structure including alternative copolymer, block copolymer, graft copolymer and random copolymer. Furthermore, the precursors can form complex two and three-dimensional structures as discussed above. The functional groups can be either linked by a spacer or simply attached to a polymer backbone. The spacer or polymer backbone can be any flexible molecular chains such as oligomethylene units or oligooxymethylene units, or it may contain functional groups such as phenyl group or amino group. The number of repeating units either in the spacer or between electroactive functional groups is preferably between 1 and 20.

Figure 7:
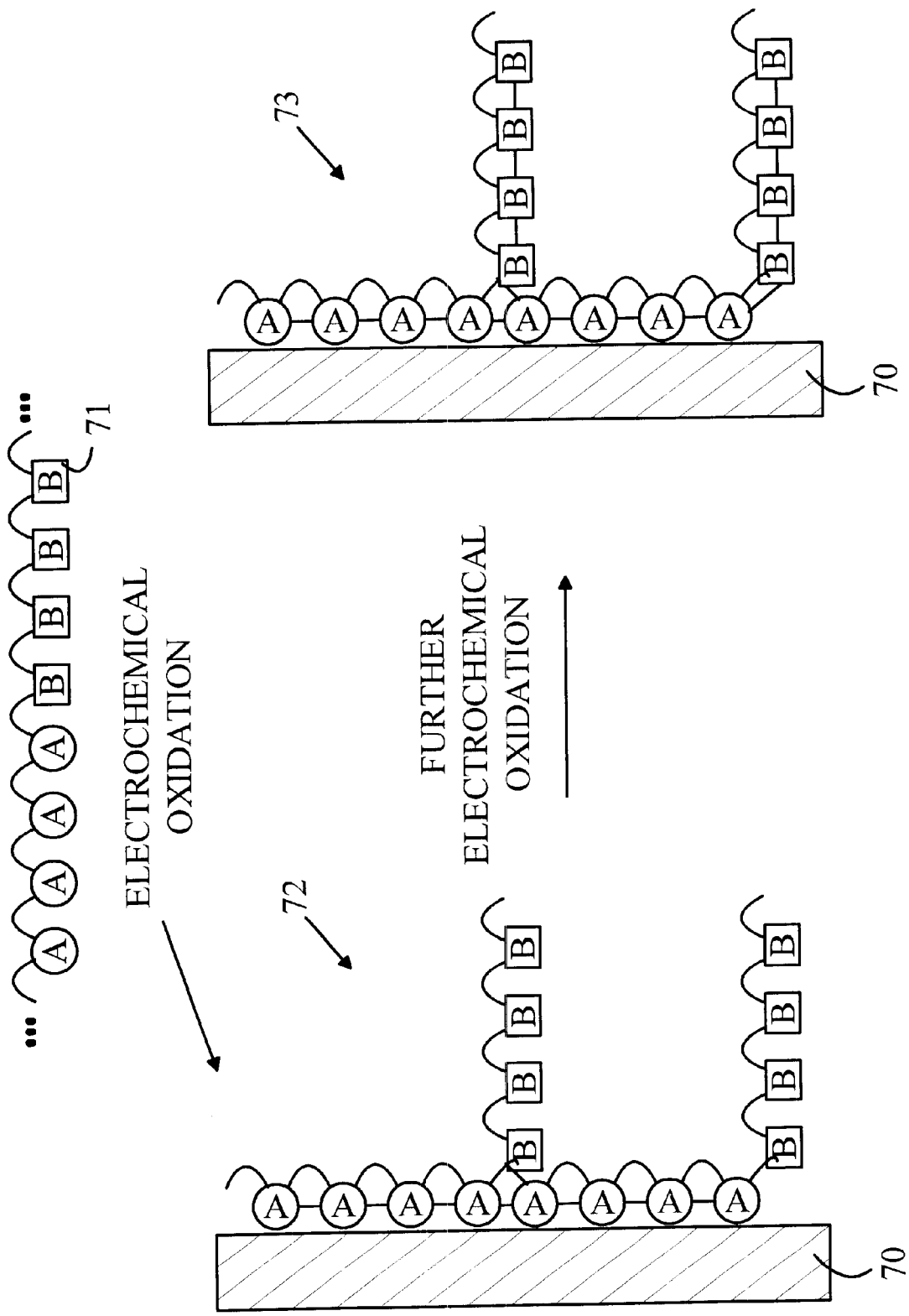
FIG. 7 illustrates the electrochemical polymerization of a precursor polymer having the configuration shown at 61 in FIG. 6 on an electrode.

Once the precursor polymer is prepared, the precursor polymer is dissolved in a solvent with an electrolyte. A cyclic voltammogram or a bulk electrolysis can be carried out for this solution. By choosing the appropriate potential of the electrode for each functional unit, the precursor polymer is polymerized and deposited on the electrode. Refer now to FIG. 7, which illustrates the electrochemical polymerization of a precursor polymer having the configuration shown at 61 in FIG. 6 on an electrode 70. For the purposes of this discussion, it will be assumed that the A-subunit has a lower oxidation potential than the B-subunit. Hence, the A-subunits will be joined at the lower potential difference between the electrode on which the film is deposited and the reference electrode. This leads to a film in which the A-subunits are polymerized as shown at 72 in FIG. 7. When all of the A-subunits have been polymerized, the B-subunits will then be oxidized to form the polymer shown at 73.

Figure 8:
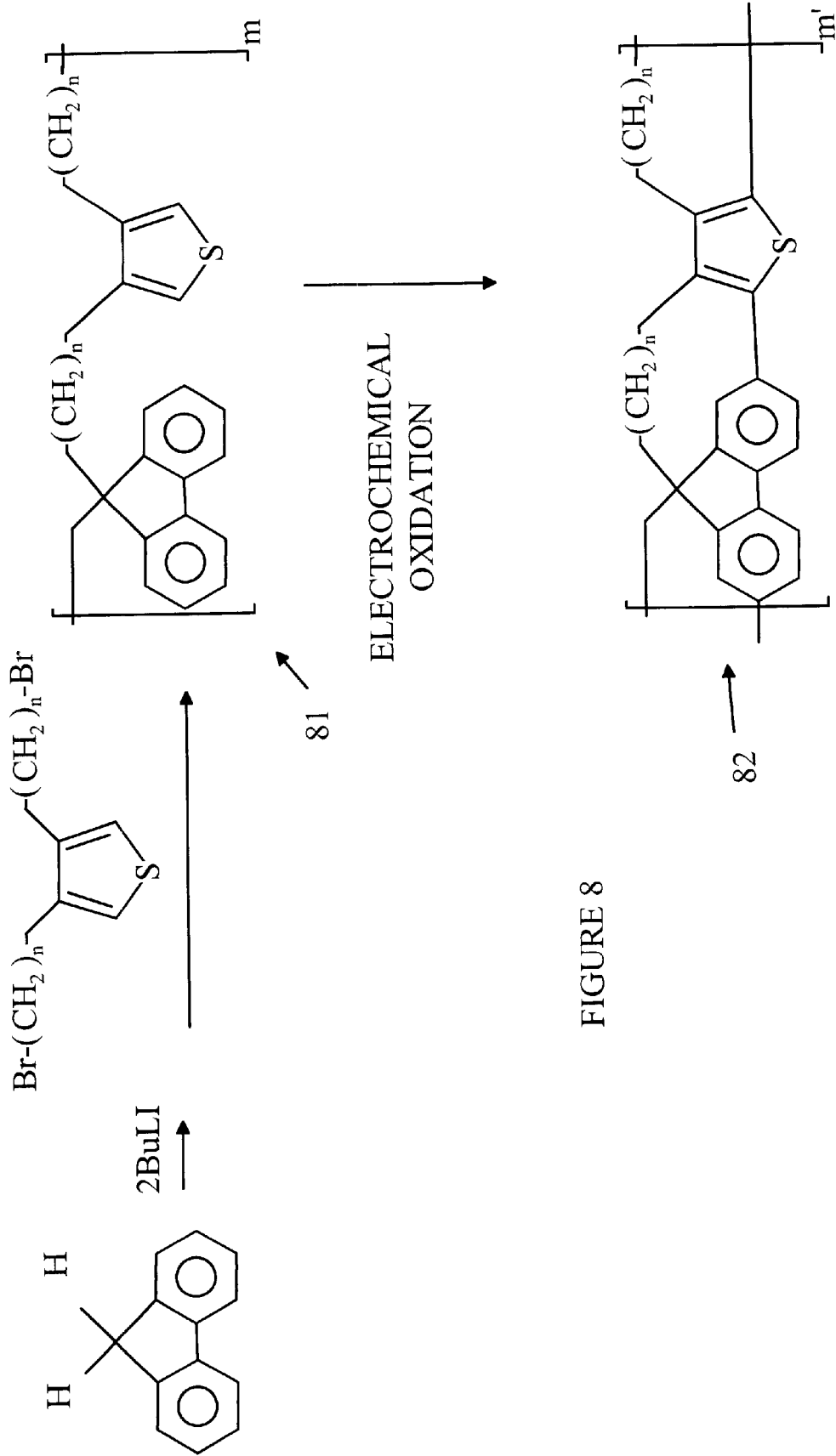
FIG. 8 is an example of the formation of an electroluminescent polymer layer based on a dimer unit such as shown in FIG. 6.

An electroluminescent polymer layer based on a dimer unit such as shown in FIG. 6 at 62 may be formed in the manner shown in FIG. 8. A precursor polymer 81 is prepared by dilithiation of fluorene with n-butyllithium, followed by the reaction with 3,4 bis($\omega$-bromoalkyl)thiophene. Polymers with n=4,6,8,10,12 can be utilized; however, precursors with other n values may also be useful. The formed precursor polymers are soluble in common organic solvents such as chloroform, dischloromethane, or toluene.

Electrochemical polymerization can then be carried out using solutions of precursor polymers at a typical concentration of 50 mM in dichloromethane as a solvent to which an electrolyte (tetrabutylammonium tetrafluoroborate: 100 mM) has been added. Conductive glass substrates with a thin layer of indium-tin oxide can be used as working electrodes. The electrochemical polymerization is carried out via cyclic voltammetry typically performed between −200 mV and +200 mV (versus Ag/Ag+ reference electrode). At the first cycle, the oxidation will be observed, due to oxidation of thiophene and fluorene, respectively. At the following cycles, reversible oxidation and reduction will be observed at around +1000 mV and +1200 mV, and the change in color of the material on the electrode will also be observed. After the polymerization is completed, the electrodes are rinsed with toluene, to remove any unpolymerized precursor polymers. A thin film of a reddish material will remain on the electrode surface. This thin film should exhibit an absorbency spectra that has the combined characteristics of poly (thiophen-2,5diyl) and poly(fluoren-1,7diyl).

Various modifications to the present invention will become apparent to those skilled in the art from the foregoing description and accompanying drawings. Accordingly, the present invention is to be limited solely by the scope of the following claims.

What is claimed is:

1. A precursor polymer prepared from a plurality of electrochemical polymerizable monomers, each monomer having first and second polymer-forming active sites that can be joined by electrochemical polymerization and third and fourth polymer-forming active sites that can be joined chemically in solution, said monomers in said precursor polymer being linked by said third and fourth polymer-forming active sites, said monomers being chosen such that said precursor polymer is soluble in a predetermined solvent while said polymer resulting from the electrochemical polymerization of said precursor polymers via said first and second polymer-forming sites is electrically conducting and insoluble in said solvent, wherein said monomers comprise fluorene, thiophene, pyrrol, biphenyl, poly(vinyl carbazole) or poly (vinyl oxy thiophene).

2. A precursor polymer prepared from a plurality of electrochemical polymerizable monomers, each monomer having first and second polymer-forming active sites that can be joined by electrochemical polymerization and third and fourth polymer-forming active sites that can be joined chemically in solution, said monomers in said precursor polymer being linked by said third and fourth polymer-forming active sites, said monomers being chosen such that said precursor polymer is soluble in a predetermined solvent while said polymer resulting from the electrochemical polymerization of said precursor polymers via said first and second polymer-forming sites is electrically conducting and insoluble in said solvent, wherein said monomers comprise a dimer constructed from two compounds selected from the group consisting of fluorene, thiophene, pyrrol, biphenyl, poly(vinyl carbazole) and poly (vinyl oxy thiophene).

3. A precursor polymer prepared from a plurality of electrochemical polymerizable monomers, each monomer having first and second polymer-forming active sites that can be joined by electrochemical polymerization and third and fourth polymer-forming active sites that can be joined chemically in solution, said monomers in said precursor polymer being linked by said third and fourth polymer-forming active sites, said monomers being chosen such that said precursor polymer is soluble in a predetermined solvent while said polymer resulting from the electrochemical polymerization of said precursor polymers via said first and second polymer-forming sites is electrically conducting and insoluble in said solvent, wherein said electrochemical polymerizable monomers comprise first and second chemical species.

4. The precursor polymer of claim 3 wherein said first and second chemical species occur randomly within said precursor polymer.

5. The precursor polymer of claim 3 wherein said precursor polymer comprises regions prepared from a plurality of monomers of said first species coupled to each other to form a co-polymer.

* * * * *